United States Patent [19]

Ezaki et al.

[11] Patent Number: 4,928,195

[45] Date of Patent: May 22, 1990

[54] IMPROVED FLOATING MAGNETIC HEAD FOR HIGH DENSITY RECORDING

[75] Inventors: Joichiro Ezaki; Yoshiaki Ito; Mikio Matsuzaki, all of Tokyo, Japan

[73] Assignee: TDK Corporation, Tokyo, Japan

[21] Appl. No.: 215,524

[22] Filed: Jul. 6, 1988

[30] Foreign Application Priority Data

Jul. 15, 1987 [JP] Japan ................. 62-176631

[51] Int. Cl.$^5$ ............ G11B 5/60; G11B 15/64; G11B 17/32
[52] U.S. Cl. ................. 360/103; 360/102
[58] Field of Search ................. 360/102-103

[56] References Cited

U.S. PATENT DOCUMENTS

4,700,248 10/1987 Coughlin et al. ............ 360/103
4,803,577 2/1988 Ezaki et al. ............ 360/102

Primary Examiner—John H. Wolff
Attorney, Agent, or Firm—Oblon, Spivak, McClelland, Maier & Neustadt

[57] ABSTRACT

A flying magnetic head designed for use in a magnetic disk apparatus and equipped with a reading/writing element attached to an air discharge end of a slider having a flying plane on its one surface opposed to a magnetic recording medium. The slider is so formed as to have specified outer dimensions including a thickness of 0.65 mm or less from the flying plane to the opposite surface on the reverse side, a length of 1 to 3 mm in the direction of air discharge, and a width of 1 to 2.5 mm in the direction orthogonal to the air discharge. Accordingly, even with a small flying height under 0.1 μm, high stability is attained in the flying characteristic with sufficient durability, and a compact structure is achievable at low production cost.

3 Claims, 7 Drawing Sheets

IMPROVED FLOATING MAGNETIC HEAD FOR HIGH DENSITY RECORDING

BACKGROUND OF THE INVENTION

1. Field of the Invention

The present invention relates to a flying type magnetic head equipped with a reading/writing element at the air discharge end of a slider having a flying plane. More particularly, it relates to an improved magnetic head in which it slider has specified dimensions so that, even with a small flying height of 0.1 μm or less, high flying stability is attainable with sufficient durability and a compact structure can be achieved at a low production cost.

2. Discussion of Background

It has been known heretofore that, in a magnetic disk apparatus, there is employed a flying type magnetic head so designed that it flies with a microscopic gap from a magnetic recording medium by a minute air bearing which is formed due to the dynamic pressure caused when the magnetic recording medium is moved. Some conventional flying type magnetic heads are disclosed in, for example, Japanese Examined Patent Publication Nos. 21329/1983, 28650/1983 and so forth. The basic construction described therein is such that a reading/writing element is attached to the air discharge end of a slider having a flying plane on its one side opposed to a magnetic recording medium.

Figure 11:
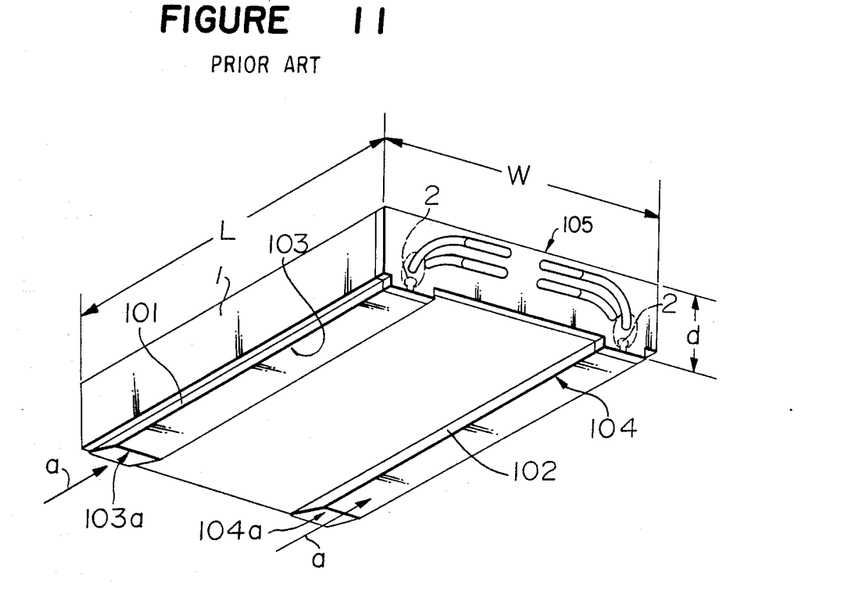
FIG. 11 is a perspective view of a conventional magnetic head.

FIG. 11 is a perspective view of such exemplary conventional magnetic head, wherein there are shown a slider 1 composed of a ceramic material or the like, and reading/writing elements 2. The slider 1 has, on its one surface opposed to a magnetic recording medium, two rails 101, 102 which are spaced apart from each other and have flying planes 103, 104 defined with a high flatness. On the flying planes 103, 104, tapered portions 103a, 104a are formed at the inflow ends thereof relative to an air stream flowing in the direction indicated by an arrow mark a in combination with the magnetic recording medium. The reading/writing element 2 is a thin-layer magnetic head element produced by the same process as in the IC manufacture technology and attached to the air discharge end on the reverse side with respect to the tapered portions 103a, 104a.

Figure 12:
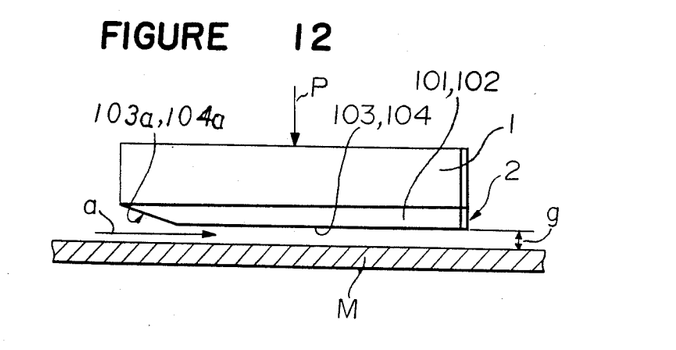
FIG. 12 illustrates the operating state of a flying magnetic head.

In the use for a magnetic disk apparatus, the magnetic head is secured to the fore end of an unshown gimbal support device, and the flying planes 103, 104 of the slider 1 are brought into elastic contact with the surface of the magnetic disk. And the magnetic head held in such a state is driven in the so-called contact start-stop mode. When the magnetic disk is kept still, the flying planes 103, 104 of the slider 1 are pressed elastically against the disk surface. But upon start of rotation of the magnetic disk, as illustrated in FIG. 12, a lifting dynamic pressure is exerted on the flying planes 103, 104 of the slider 1 including the tapered portions 103a, 104a, so that the magnetic head is caused to fly by a height g based on the balance between such dynamic pressure and the resilient pressure P of the gimbal spring.

In the conventional magnetic head, it is customary that the outer dimensions of the slider 1 are so selected as to include a thickness of 0.85 mm between each of the flying planes 103, 104 and the opposite surface 105 on the reverse side, a length L of 4 mm in the direction of the air discharge, and a width w of 3.2 mm or so in the direction orthogonal to the air discharge, whereby stable flying characteristic is achieved in a flying height range over 0.3 μm.

In the conventional magnetic head, as described above, it is possible to attain satisfactory flying characteristic with stability in a range of the flying height exceeding 0.3 μm. However, if the flying height g is set under 0.1 μm, which is less than one third of the known value, for reducing the spacing loss to meet the requirement of a higher magnetic recording density, the following problems arise to consequently fail in realizing an improved magnetic head which ensures sufficient durability while maintaining stable flying characteristic with a flying height under 0.1 μm.

(a) The cubage determined by a thickness d of 0.85 mm, a length L of 4 mm and a width w of 3.2 mm thus becomes great to bring about an increase of the mass, hence lowering the resonance frequency of the head-gimbal system. Accordingly, in realizing a magnetic head operable with a small flying height under 0.1 μm, crash is prone to occur to eventually deteriorate the durability.

(b) In an attempt to minimize the flying height to less than 0.1 μm, it becomes difficult to maintain a proper balance between the dynamic pressure and the support spring pressure, thereby disordering the flight posture with a failure to attain stable flying characteristic.

(c) If the resilience of the support spring is strengthened to set the flying height under 0.1 μm, the flying planes 103, 104 of the slider kept still are pressed forcibly against the magnetic disk surface, so that the frictional wear at the start is increased to eventually induce deterioration of the durability.

(d) The entire structure comes to have a large cubage determined by a thickness d of 0.85 mm, a length L of 4 mm and a width w of 3.2 mm, whereby dimensional compactness fails to be realized with concomitant increase of the production cost.

(e) The air discharge end with the reading/writing elements 2 attached thereto comes to have a large area determined by a thickness d of 0.85 mm and a width w of 3.2 mm, so that the pitch interval between the reading/writing elements 2 is widened. Therefore the number of such reading/writing elements 2 arrangeable in a wafer is reduced to consequently bring about increase of the production cost.

SUMMARY OF THE INVENTION

The present invention has been accomplished for the purpose of solving the problems mentioned relative to a magnetic head where reading/writing elements are attached to the air discharge end of a slider having a flying plane on it one side opposed to a magnetic recording medium.

The foregoing and the other objects of the present invention have been attained by providing a magnetic head with a reading/writing element attached to an air discharge end of a slider having a flying plane on its one surface opposed to a magnetic recording medium, characterized in that the outer dimensions of the slider are so selected as to include a thickness of 0.65 mm or less from the flying plane to the opposite surface on the reverse side, a length of 1 to 3 mm in the direction of air discharge, and a width of 1 to 2.5 mm in the direction orthogonal to the air discharge.

Due to such dimensions selectively specified, the mass of the slider is remarkably reduced in comparison with that of the conventional magnetic head. Therefore the resonance frequency of the head-gimbal system is rendered higher so that, even when the flying height is set to be less than 0.1 μm, occurrence of crash is hardly induced while the spacing loss is minimized to eventually realize an improved magnetic disk apparatus with sufficient durability.

Furthermore, because of the dimensional reduction of the whole slider the lifting dynamic pressure is lowered to naturally decrease the required spring pressure, whereby the loading force exerted between the flying plane and the magnetic disk in the state of mutual contact is decreased to diminish the frictional wear, hence enhancing the durability.

In addition, the cubage of the slider is rendered extremely smaller than that of the conventional magnetic head, thereby achieving considerable miniaturization of the entire structure to consequently lower the production cost. In particular, the end face area of the slider to be equipped with reading/writing elements is reduced so that, in case each reading/writing element is composed of a thin layer to constitute a magnetic head, the number of such elements arrangeable in a wafer is increased to make a great contribution to curtailment of the production cost.

When the thickness d from the flying plane to the opposite surface on the reverse side is in excess of 0.65 mm, the center of gravity is shifted toward the opposite surface connected to a gimbal spring, so that the flying stability is deteriorated. If the length L and the width w are both decreased to be smaller than 1 mm, it becomes impossible to ensure a sufficient flying plane area for maintaining the stable flying characteristic, which is thereby deteriorated.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Hereinafter exemplary embodiments of the present invention will be described in detail with reference to the accompanying drawings.

Figure 1:
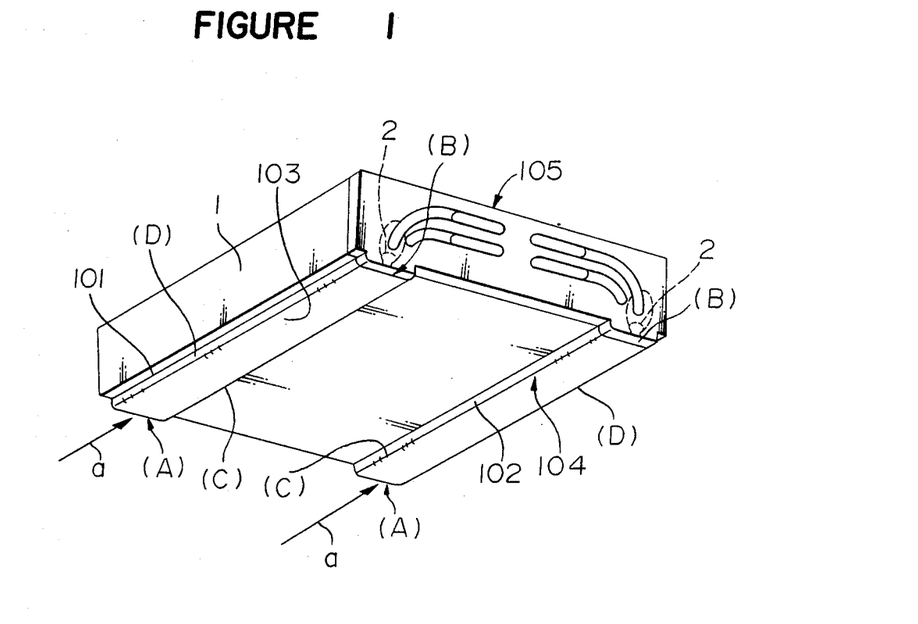
FIG. 1 is a perspective view of an exemplary magnetic head embodying the present invention.
Figure 2:
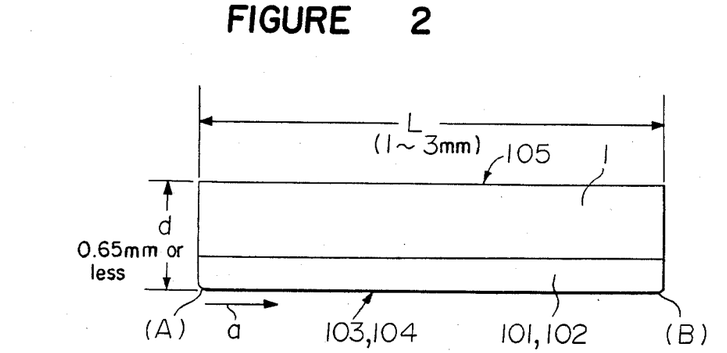
FIG. 2 is a front view of a slider.
Figure 3:
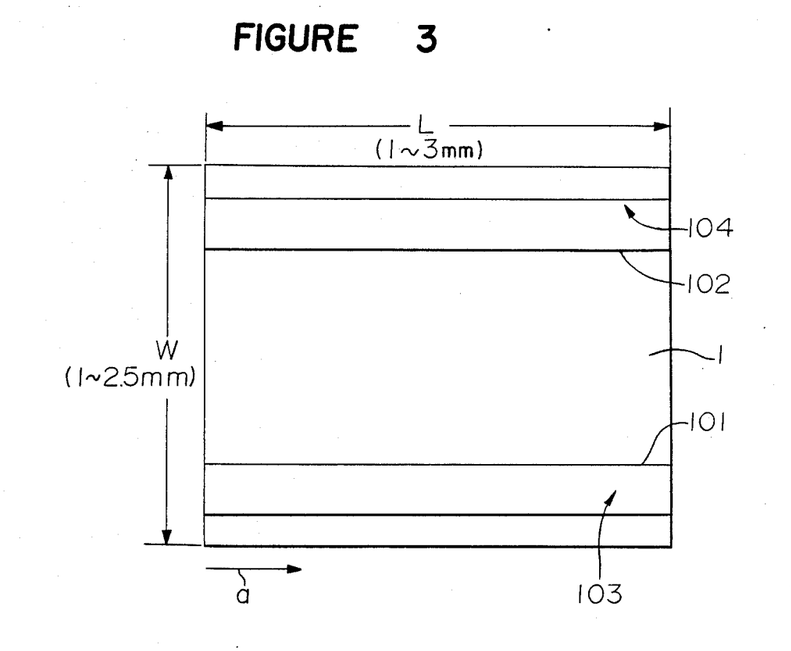
FIG. 3 is a bottom view of the slider seen from the direction of its flying plane.
Figure 4:
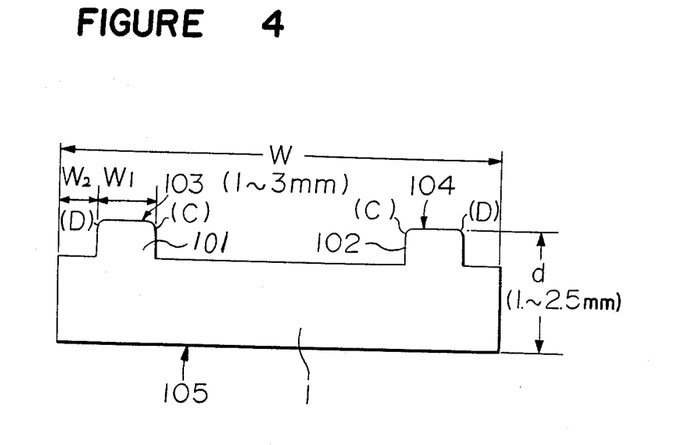
FIG. 4 is a side view of the slider.

FIG. 1 is a perspective view of a magnetic head according to the present invention; FIG. 2 is a front view of a slider; FIG. 3 is a bottom view of the slider seen from the direction of its flying plane; and FIG. 4 is a side view of the slider, wherein the same reference numerals as those used in the conventional example of FIG. 11 denote corresponding component parts. A slider 1 is dimensionally so formed as to have a thickness of 0.65 mm from its flying plane 103, 104 to an opposite surface 105 on the reverse side, a length L of 1 to 3 mm in an air discharge direction (running direction) a and a width w of 1 to 2.5 mm in the direction orthogonal to the air discharge direction a. Since the thickness of a portion for attachment of a reading/writing element 2 is substantially negligible in comparison with the length L of the slider, the length L is substantially regarded as the dimension including the reading/writing element 2.

In an exemplary embodiment of FIGS. 1 through 4, the flying planes 103, 104 of the slider 1 are shaped to be flat without any tapered surface for generation of a lifting force. It is preferred that, as viewed from the air discharge direction a, the end portions (A) and (B) of the flying planes 103, 104 be arcuate so as to eliminate any undesired catch on the magnetic disk surface at the time of contact start. Also other end portions (C) and (D) may be shaped arcuate.

Although not illustrated, one rail may be provided substantially at the transverse center, and a flying plane may be formed on the surface of such rail. In this structure, an advantage is achievable in diminishing the dimensions of the whole.

In case the length and the width of the slider are greater than 1 mm and smaller than 1.5 mm respectively, the entire surface opposed to the disk may be formed into a flying plane.

Figure 5:
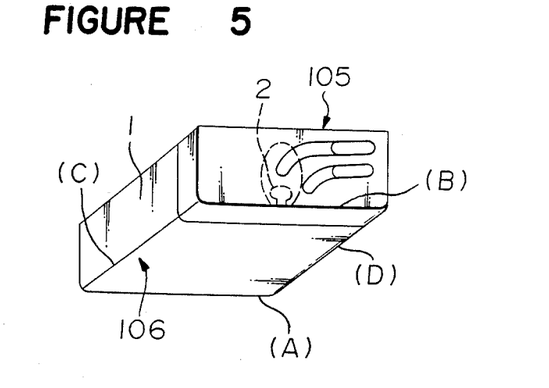
FIG. 5 is a perspective view of another exemplary magnetic head embodying the present invention.

FIG. 5 is a perspective view of another example embodying the magnetic head of the present invention. In this embodiment, a flying plane 106 of a slider 1 is shaped into a flat surface without any rail, and its edges (A) through (D) are shaped to be arcuate.

According to the above-mentioned magnetic head, stable flying characteristic and sufficient durability can be accomplished at a flying height under 0.1 μm in combination with a head supporting device. Now a specific example will be descried below in further detail. In the structure of the embodiment shown in FIGS. 1 through 4, the outer dimensions of the slider 1 are so selected as to include a thickness d of 0.65 mm, a length L of 2.8 mm, and a width w of 2.3 mm. Meanwhile each of the flying planes 103, 104 is defined to have a width w1 of 0.3 mm.

Figure 6:
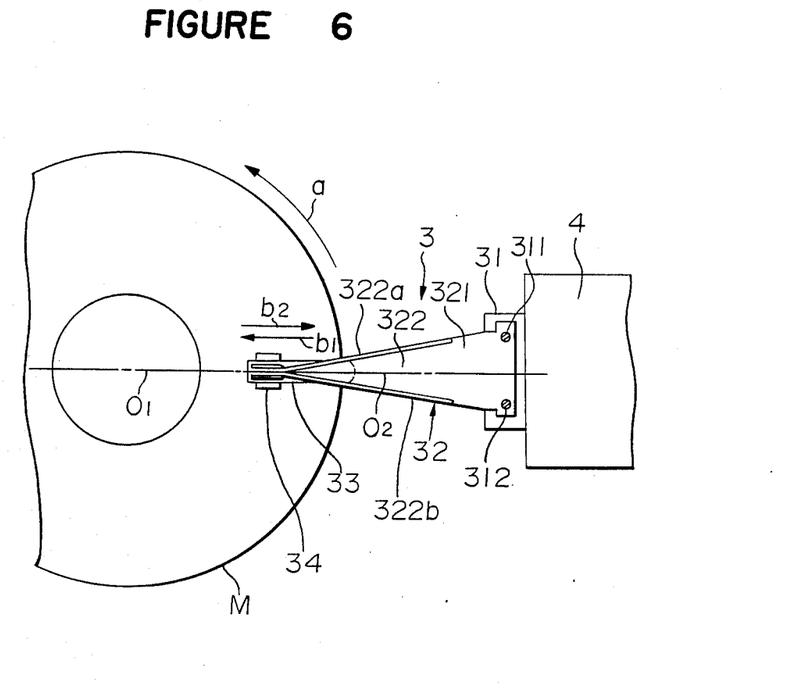
FIG. 6 shows a magnetic disk apparatus using the magnetic head of the present invention.

A magnetic disk apparatus is assembled with such magnetic head attached to a head supporting device. FIG. 6 illustrates the relationship between the magnetic disk apparatus thus constituted and a magnetic disk. In this diagram are shown a magnetic disk M, a head supporting device 3, and a positioning device 4. The magnetic disk M is driven to rotate in the direction of an arrow mark a by an unshown rotational derive mechanism. The head supporting device 3 is positioned on the rotational diameter $0_1$ while being driven in the direction of an arrow mark b1 or b2 by the positioning device 4, so that a magnetic recording/reproducing operation is performed on a predetermined track between the magnetic disk M and the magnetic head.

In the head supporting device 3, one end of a supporter 32 composed of a resilient thin metal plate is anchored firmly by means of fastening members 311, 312 to a rigid arm portion 31 attached to the positioning device 4, and a flexible member 33 composed of a thin metal plate is attached to a distal free end of the supporter 32 in the longitudinal direction. And the magnetic head 34 of the present invention is secured to the lower surface of the flexible member 33. One region of the supporter 32 attached to the rigid arm portion 31 serves as a resilient spring portion 321, and a rigid beam portion 322 is formed adjacently to the resilient spring portion 321. The rigid beam portion 322 has, on its two sides, flanges 322a, 322b bent laterally to obtain a loading force required for pressing the magnetic head 34 against the magnetic disk M. In this embodiment, the respective length, thicknes and elasticity of the rigid arm portion 31, supporter 32 and flexible member 33 are so selectively determined that the loading force applied from the magnetic head 34 to the magnetic disk M becomes 9.5 grams.

Figure 7:
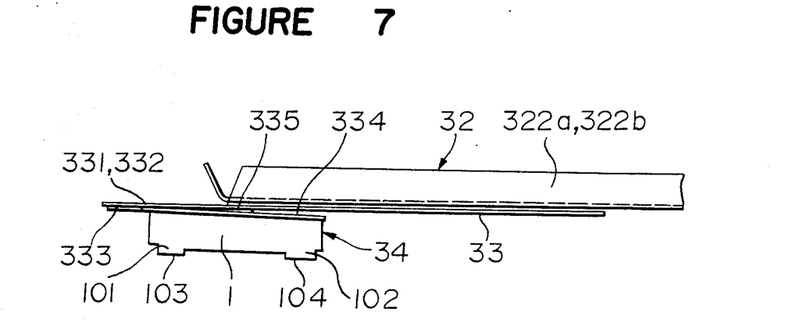
FIG. 7 is a front view of principal components in a head supporting device.
Figure 8:
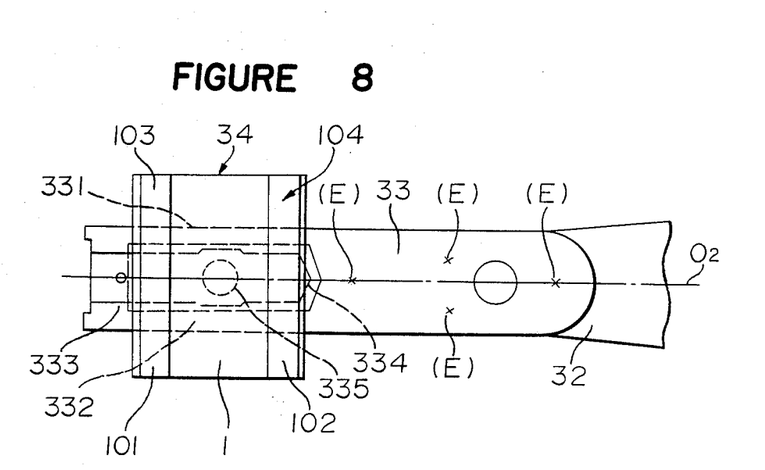
FIG. 8 is a bottom view of such head supporting device seen from the direction of the flying plane.

FIG. 7 is a front view of principal components in the head supporting device, and FIG. 8 is a bottom view of such head supporting device seen from the direction of the flying plane. The flexible member 33 comprises two outer frame portions 331, 332 extending substantially in parallel with the longitudinal axis $0_2$ of the supporter 32, a lateral frame 333 connecting the flexible outer frame portions 331, 332 mutually at the end spaced apart from the supporter 32, and a central tongue portion 334 having a free fore end extending substantially in parallel with the flexible outer frame portions 331, 332 from the mid region of the lateral frame 333. One end of the flexible member 33 on the reverse side with respect to the lateral frame 333 is attached to the vicinity of the free end of the supporter 32 by welding (E) or the like.

On the upper surface of the central tongue portion 334 in the flexible member 33, there is provided a loading porjection 335 shaped to have a semispherical or similar contour, so that the load can be transmitted by such projection 335 from the free end of the supporter 32 to the central tongue portion 334. The magnetic head 34 of the present invention is secured firmly to the lower surface of the central tongue portion 334 by means of bonding or the like.

It has been experimentally confirmed in the constitution of FIG. 6 that a flying height of 0.09 μm is obtained by flying the magnetic head in a region of the magnetic disk M where its peripheral speed is 9 m/sec.

Figure 9:
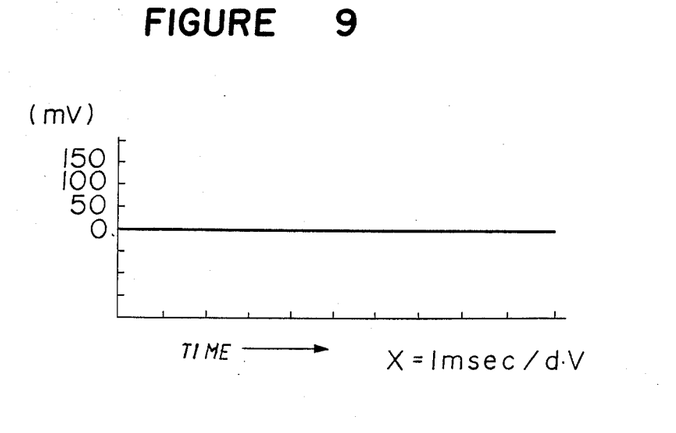
FIG. 9 graphically shows the measured data of the flying stability in the magnetic disk apparatus using the magnetic head of the present invention.
Figure 10:
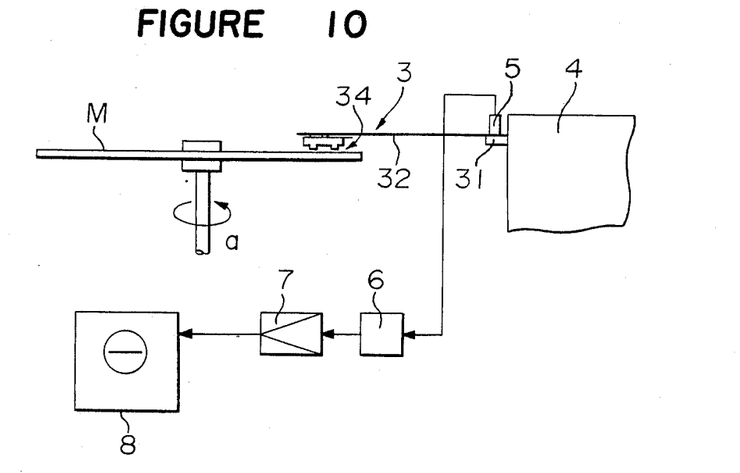
FIG. 10 illustrates a measuring system employed for obtaining the data of FIG. 9.

FIG. 9 graphically shows the measured data representing the flying characteristic of the magnetic disk apparatus shown in FIGS. 6 through 8. The data of FIG. 9 have been obtained by the use of such a measuring system as illustrated in FIG. 10. In this diagram, there are shown an acoustic emission sensor (hereinafter referred to as AE sensor) 5, filter 6, an amplifier 7, and an oscilloscope 8. The measuring conditions in FIG. 10 are as follows:

| | | |
|---|---|---|
| Flying height of magnetic head 34: | | 0.09 μm |
| Spring load: | | 9.5 gr |
| Peripheral speed of magnetic disk M: | | 9 m/sec |
| Measuring frequency: | | 150–400 kHz |
| Amplification factor: | | 60 dB |
| Surface smoothness of magnetic disk M: | | Rmax < 100Å |
| Oscilloscope 8: | X-axis | 5 sec/div |
| | Y-axis | 50 mv/div |

As will be obvious from the measured data shown in FIG. 10, nearly no output is produced from the AE sensor in the magnetic disk apparatus employing the flying magnetic head 34 of the present invention. It is therefore understood that, despite decrease of the flying height to a small value of 0.09 μm, the proper flight posture is still maintained in the flying magnetic head of the present invention, and the satisfactory stability is retained in the flying characteristic.

As described hereinabove, the following effects are achievable according to the present invention.

(a) Stable flying characteristic can be ensured even in a small flying height range under 0.1 μm, hence realizing an improved flying magnetic head adapted to attain a further higher recording density in the magnetic disk apparatus.

(b) The pressure exerted between the flying plane and the magnetic disk in the state of mutual contact is low to consequently reduce the frictional wear at the start time, thereby enhancing both the abrasion resistance and the durability of the flying magnetic head.

(c) Sufficient stability can be retained in the flying characteristic even in a small flying height range under 0.1 μm, so that the flying magnetic head is rendered suitable for any magnetic disk of high surface smoothness such as an example composed of a glass base and a magnetic thin film.

(d) A compact magnetic head can be accomplished at low production cost.

While exemplary embodiments of the present invention have been described hereinabove, it will be apparent to those skilled in the art that various minor modifications may be made therein without departing from the spirit and scope of the invention as claimed.

What is claimed is:

1. A magnetic head with a reading/writing element attached to an air discharge end of a slider having a flying plane on its one surface opposed to a magnetic recording medium, characterized in that the outer dimensions of said slider are so selected as to include a thickness of 0.65 mm or less from said flying plane to the opposite surface on the reverse side, a length of 1 to 3 mm in the direction of air discharge, and a width of 1 to 2.5 mm in the direction orthogonal to the air discharge.

2. The magnetic head according to claim 1, wherein said flying plane is shaped to be flat without any tapered face in the air inflow portion.

3. The magnetic head according to claim 1, wherein the air inflow end(s) of said flying plane is shaped to be arcuate.

* * * * *

UNITED STATES PATENT AND TRADEMARK OFFICE
CERTIFICATE OF CORRECTION

PATENT NO. : 4,928,195
DATED : MAY 22, 1990
INVENTOR(S) : JOICHIRO EZAKI ET AL

It is certified that error appears in the above-identified patent and that said Letters Patent is hereby corrected as shown below:

In Figure 4 of the Drawings, please change "(1~2.5mm)" to --0.65mm or less--; also change "3mm" to --2.5mm--.

Signed and Sealed this

Tenth Day of September, 1991

Attest:

HARRY F. MANBECK, JR.

Attesting Officer  Commissioner of Patents and Trademarks